(12) United States Patent
Allen

(10) Patent No.: US 10,969,055 B2
(45) Date of Patent: Apr. 6, 2021

(54) DIRECT FLAME IMPINGEMENT SHIELD

(71) Applicant: Derek Allen, Fairview, MT (US)

(72) Inventor: Derek Allen, Fairview, MT (US)

( * ) Notice: Subject to any disclaimer, the term of this patent is extended or adjusted under 35 U.S.C. 154(b) by 188 days.

(21) Appl. No.: 16/373,424

(22) Filed: Apr. 2, 2019

(65) Prior Publication Data

US 2020/0318775 A1    Oct. 8, 2020

(51) Int. Cl.
*F16L 57/04* (2006.01)
*E21B 43/34* (2006.01)
*C10G 33/00* (2006.01)

(52) U.S. Cl.
CPC .............. *F16L 57/04* (2013.01); *C10G 33/00* (2013.01); *E21B 43/34* (2013.01); *C10G 2300/1033* (2013.01); *C10G 2300/201* (2013.01); *C10G 2300/4056* (2013.01); *C10G 2300/4075* (2013.01)

(58) Field of Classification Search
None
See application file for complete search history.

(56) References Cited

U.S. PATENT DOCUMENTS 4,396,404 A * 8/1983 Engelman .......... B01D 17/0208
                                                    95/252
2018/0321133 A1* 11/2018 Allen .................... G01N 27/83

\* cited by examiner

*Primary Examiner* — Derek N Mueller
(74) *Attorney, Agent, or Firm* — Schmeiser, Olsen & Watts LLP

(57) ABSTRACT

Described are direct flame impingement shields for fire tubes in heater treaters which reduce corrosion of the fire tubes. The direct flame impingement shield is removable and replaceable. The direct flame impingement shield may be formed from a variety of types of stainless steel or other corrosion resistant material.

20 Claims, 3 Drawing Sheets

US 10,969,055 B2

DIRECT FLAME IMPINGEMENT SHIELD

BACKGROUND OF THE INVENTION

Technical Field

This invention relates to a direct flame impingement shield for fire tubes used in vertical or horizontal heater treaters in order to decrease corrosion and extend the lives of the tubes.

State of the Art

In the oil and gas industry, it is necessary to separate oil from salt water and other unwanted contaminants prior to shipping the oil to a refinery. One of the devices used to separate oil from salt water and unwanted contaminants is a heater treater. At an oil field, the oil is pumped from the ground and directly or indirectly into a heater treater. A heater treater uses heat, pressures and chemicals in order to separate unwanted fluids and materials from oil.

A heater treater is a tank containing a heat source. This heat source is contained in a tube called a fire tube. A fire tube is a large u-shaped metal pipe that is placed in the heater treater and submerged in the oil and water mixture. Typically, a fire tube is made from steel pipe ranging in diameter from 12 inches to 24 inches and has a length of 4 feet to 15 feet.

One end of the fire tube contains a heat source such as a burner with an open flame. The other end of the fire tube is connected to a chimney stack for venting exhaust. The fire tube prevents the flame or heating element from direct contact with the oil and water mixture.

Fire tubes tend to pit and corrode very quickly. Additionally, fire tubes are exposed to heat which accelerates this corrosion. If a fire tube degrades too much, significant salt water spills, oil spills, fires or accidents may occur. Therefore, it is very important to replace fire tubes before they fail.

Presently fire tubes are simply replaced when they become too corroded or begin to leak. This can be costly as fire tubes can corrode in as little time as a few months. Additionally, production time is lost when the fire tubes are replaced.

Accordingly, alterations to fire tubes are needed in order to extend the life of the tubes and reduce cost. Therefore, it is an object of the invention to provide a barrier between the fire tube and the open flame. It is a further object of the invention to protect the tube and improve heat distribution by creating a radiant heat tube, thereby reducing the catastrophic effects of direct flame impingement.

SUMMARY OF EMBODIMENTS

The present invention discloses a protective wrap for a fire tube which makes it more corrosion resistant. Disclosed is a direct flame impingement shield comprising: a barrier tube; a tapered end portion on a back end of the barrier tube; a flared end portion on a front end of the barrier tube; a cross member internally positioned towards the front end of the barrier tube; and a leveling member externally positioned towards the back end of the barrier tube. The barrier tube, the tapered end portion, the flared end portion, the cross member and the leveling member may be formed from a corrosion resistant material. The corrosion resistant material may be selected from the group consisting of modified stainless steel, hybrid stainless steel, blended stainless steel and/or mixtures thereof. An end of the flared end portion may be wider than the barrier tube.

Disclosed is a fire tube for a heater treater comprising: a direct flame impingement shield, the direct flame impingement shield comprising: a barrier tube; a tapered end portion on a back end of the barrier tube; a flared end portion on a front end of the barrier tube; a cross member internally positioned towards the front end of the barrier tube; and a leveling member externally positioned towards the back end of the barrier tube, wherein the direct flame impingement shield is removably coupled to the fire tube. The direct flame impingement shield may extend over a portion of a length the fire tube. The direct flame impingement shield may be formed from a corrosion resistant material. The corrosion resistant material may be selected from the group consisting of modified stainless steel, hybrid stainless steel, blended stainless steel, carbon steel and/or mixtures thereof. An end of the flared end portion may be wider than the barrier tube. The leveling member may rest on an inside surface of the fire tube.

Disclosed is a method of heating and separating a raw product comprising: passing the raw product through a heater treater having a fire tube; heating a fire tube with a heat source, wherein the fire tube comprises a direct flame impingement shield, the direct flame impingement shield comprising: a barrier tube; a cross member internally positioned towards the front end of the barrier tube; and a leveling member externally positioned towards the back end of the barrier tube, wherein the direct flame impingement shield is removably coupled to the fire tube; and separating the raw product. The direct flame impingement shield may further comprise a tapered end portion on a back end of the barrier tube and a flared end portion on a front end of the barrier tube. The direct flame impingement shield extends over a portion of a length the fire tube. The direct flame impingement shield may be formed from a corrosion resistant material. The corrosion resistant material may be selected from the group consisting of modified stainless steel, hybrid stainless steel, blended stainless steel, carbon steel and/or mixtures thereof. An end of the flared end portion is wider than the barrier tube. The leveling member may rest on an inside surface of the fire tube. The heat source may rest on the cross member. The heating and separating may be at a well site. The heating and separating may be at a well site. The heating and separating may be at a refinery.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
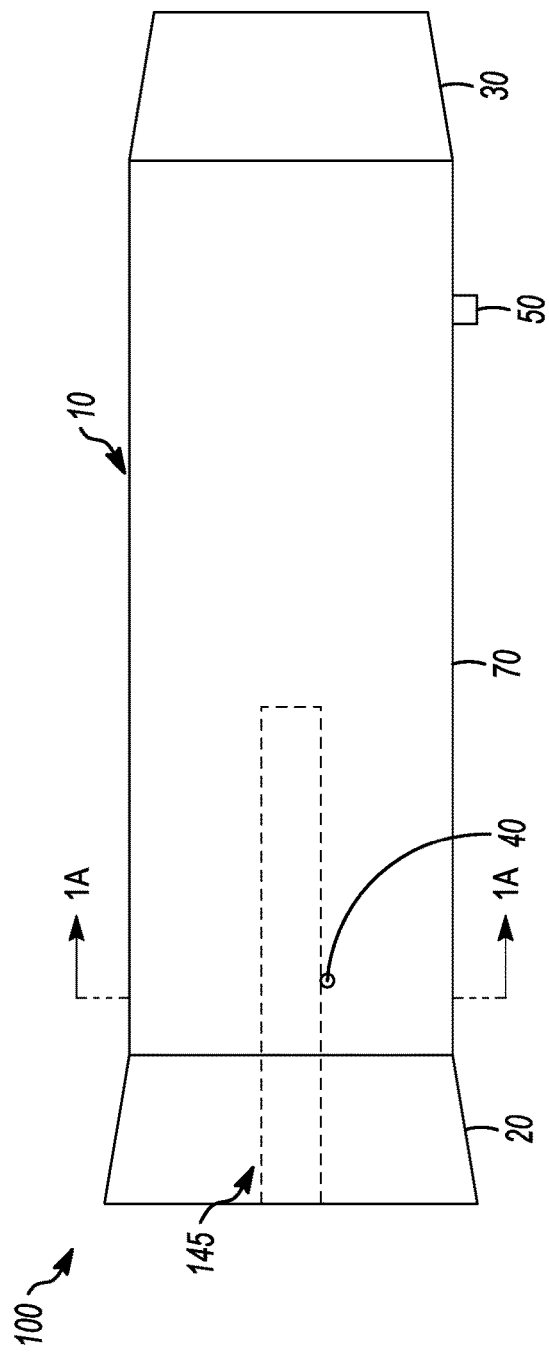
FIG. 1 is a schematic representation of a direct flame impingement shield in accordance with the invention.

Embodiments of this invention disclose a direct flame impingement shield (DFIS) for a fire tube in a heater treater which reduces or prevents failures due to corrosion. In the gas and oil industry, heater treaters are used to separate oil from water and other contaminants. This is done by adding heat, pressure and chemicals to the mixture.

Oil is extracted out of the ground using a pumping unit. As the fluid is removed from the ground it then needs to be treated to separate the products. The raw emulsion is separated into three products: oil, water, and gas.

The function of the heater treater is to heat and separate the raw product extracted. This separation process occurs frequently on the well site but can also be completed at the refinery. To ensure the product is properly separated it needs to be heated to a specific temperature. The outside of the fire tube is typically submersed in the oil, water and chemical mixture. Heat may be provided to the fire tube in many ways including flame igniter and the like. The heat provided to the fire tube heats the oil, water and chemical mixture contained in the heater treater causing the oil and water to separate.

The fire tube is a large "U" shaped tube (pipe) that is attached to a flange which is bolted into a vessel (heater treater). The fire tube contains a heat source which is generally an open flame powered by an onsite gas fuel source, such as a flame igniter. As the flame heats the fire tube, corrosion and pitting occur which can then lead to the failure of that fire tube. The direct heat source is a major issue, as the flame can only heat one portion of the fire tube rather than utilizing the entire surface area to absorb heat. When a fire tube fails, it can result in a fire or an environmental spill; both of which are a major hazard. This results in a destructive environmental event.

Generally, the fire tube is made from steel pipe ranging in diameter from about 12 inches to about 24 inches and in length from about 4 feet to 15 about feet. Due to the open flame the lower portion of the fire tube corrodes most significantly during use.

The direct flame impingement shield in accordance with the invention may be removably installed in the lower portion of the fire tube and may extend over a portion of the length in the range of about 30% to about 90% of the fire tube. The direct flame impingement shield is a tube of stainless steel or other corrosion resistant material which is inserted in the fire tube in order to prevent the flame from acting on the fire tube. When the direct flame impingement shield fails, the DFIS is removed and replaced. Replacement of a direct flame impingement shield is far less time consuming and expensive as compared to replacement of a fire tube.

The direct flame impingement shield in accordance with the invention comprises a barrier tube, a flared end portion, a tapered end portion, a cross member and a leveling member. Generally, the length of the direct flame impingement shield is in the range of from about 3 to about 16 feet.

The barrier tube is the heated area inside the fire tube which distributes heat evenly through the fire tube. Generally, the barrier tube has a diameter in the range of from about 6 to about 24 inches, for example, 13 inches or 15 inches. The barrier tube length is in the range of from about 2 feet to about 14 feet, for example 3 feet The flared end portion may be used to control air flow coming in to the fire tube through flame arrestor 130. As air flows in to the fire tube it is slowed down by flame arrestor 130 located outside the fire tube attached onto the lower fire tube flange. The air flow is not controlled and can cause rapid heat loss. The flared end portion of the direct flame impingement shield is in place to direct all air moving into the fire tube. This air must pass by the heating source before exiting the fire tube. The flared end portion does allow for a small gap between the fire tube wall and shield, this is done to prevent the shield from wedging inside the fire tube. Generally, the flared end portion diameter is in the range of about 8 inches to about 26 inches at the widest most part of the flare, for example, 15 inches or 17 inches. The diameter of the widest most part of the flare is larger than the barrier tube diameter.

The tapered end portion may be used to reduce the volume of heated air flowing out of the fire tube. To achieve a radiant heat fire tube, the direct flame impingement shield also has a secondary function which slows the airflow. This allows heated air to remain inside the fire tube longer which increases heat distribution. One of the primary problems with the current heating method is the air escapes very quickly through the fire tube. This results in the flame to burn hotter and more frequently becoming more of an impingement on the steel as the fire tube will requires more heat to heat the vessel. The tapered end portion of the barrier tube slows the heated air resulting in a more effective heat exchange. Generally, the tapered end portion has a diameter in the range of about 2 inches to about 22 inches, for example 11 inches or 13 inches at the narrow most part of the taper. The diameter of the narrow most part of the taper is smaller than the diameter of the widest most part of the flare and smaller than the barrier tube diameter.

The cross member may be used to ensure a secured placement of the heat source Often times the heat source will loosen and move down causing a direct flame impingement on the bottom section of the fire tube. The purpose of the cross member is to ensure the heat source is secure and in the correct position at all times. Generally, the cross member may be a bar, for example, a ½ inch round bar.

The leveling member may be used to level the direct flame impingement shield in the fire tube to ensure even heat distribution. The direct flame impingement shield must remain in a level position to optimize the level of radiant heat transferred. The leveling member ensures the DFIS remains level. The leveling member is attached to the external surface of the barrier tube to level the direct flame impingement shield in the fire tube. Generally, the leveling member may be, for example, a riser or small hollow pipe having a diameter in the range of ½ inch to about 1 inch, for example a 1 inch pipe for standoff in the fire tube.

The direct flame impingement shield may be constructed of corrosion resistant material including stainless steel or other alloy metals. This corrosion resistant material allows for heat to be radiated from the source and can withstand exposures to direct flame. Stainless steel is the preferred material used in the direct flame impingement shield and provides a necessary strength to create a radiant heat tube. Stainless steel will take heat and distribute it throughout its entire surface area. The direct flame impingement shield may be made out of multiple blends of stainless steel, duplex materials and/or carbon steel. The corrosion resistant material may be ¹/₁₆ inch, ⅛ inch or ¼ inch in thickness, or any other standard or non-standard thickness of material. Optionally, the direct flame impingement shield may be manufactured without a flared end portion and/or a tapered end portion.

Suitable corrosion resistant materials for the direct flame impingement shield may include, but are not limited to, carbon steel and various types of stainless steel including Zeron® 100, Super Duplex stainless steel, modified stainless steel, hybrid stainless steel, blended stainless steel, austenitic stainless steel and the like. Additionally, other combinations of blended metals may also be used. Possible materials include but are not limited to: UNS 532760, UNS N08367, UNS N06625, UNS N06333, UNS N08330, UNS 530400, UNS 530900, UNS 531600, and UNS 531703.

For the purposes of this disclosure, the following terminology has the following meanings. Super Duplex Stainless Steel is a stainless steel formed from an approximately 50/50 mixture of austenitic and ferritic phases and are sometimes referred to as austenitic-ferritic stainless steels. Zeron® 100 is Zeron® 100, Super Duplex Stainless Steel, a form of stainless steel developed and sold by Rolled Alloys which is extremely heat and corrosion resistant. Austenitic stainless steels are stainless steels which contain high amounts of chromium and nickel and have a face-centered crystalline structure.

The barrier tube, flared end portion, tapered end portion, cross member and leveling member of the direct flame impingement shield may be coupled together through welding, bolts, screws, and/or multiple types of adhesive, or manufactured as an integral unit.

Components of the direct flame impingement shield may be welded directly to the barrier tube by means of arc welding, MIG or TIG welding, laser welding, or plasma welding using welding fillers.

Figure 1A:
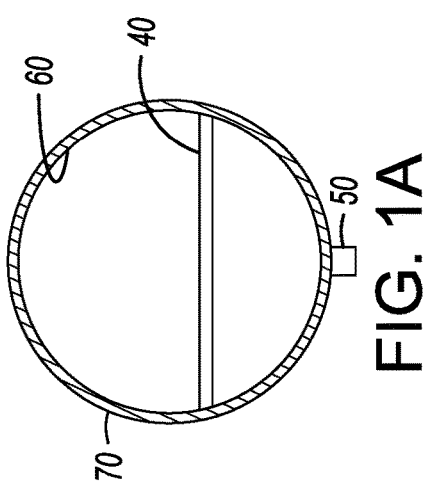
FIG. 1A is a cross sectional view of the direct flame impingement shield of FIG. 1 in accordance with the invention.

FIGS. 1 and 1A illustrate a direct flame impingement shield for use in a fire tube according to the invention. Direct flame impingement shield 100 includes barrier tube 10 having a flared end portion 20 and a tapered end portion 30. Cross member 40 is positioned horizontally across internal surface 60 of barrier tube 10 towards flared end portion 20 of barrier tube 100. Leveling member 50 is attached on an external surface 70 of barrier tube 10 towards tapered end portion 30 of barrier tube 10.

Figure 2:
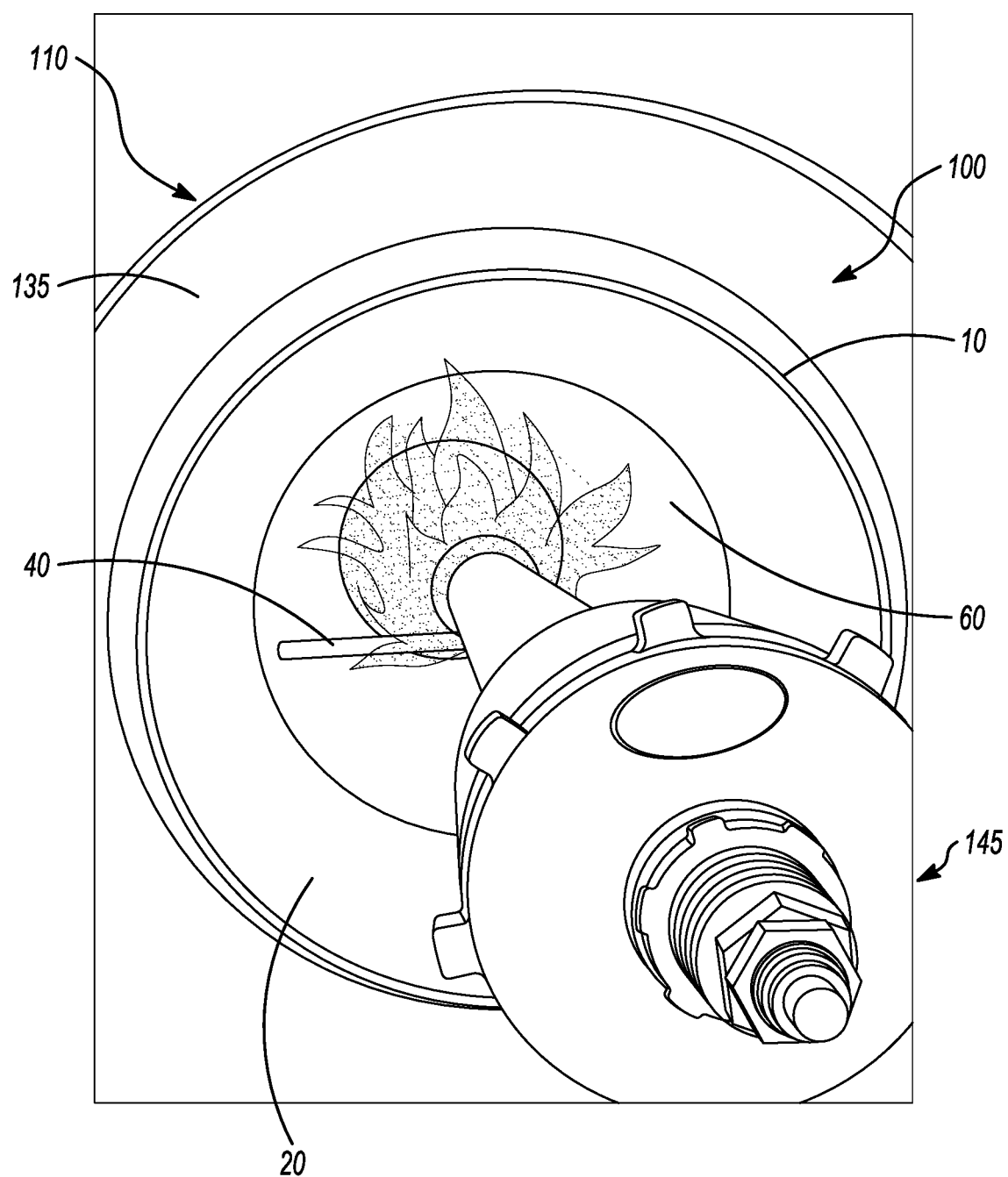
FIG. 2 is a perspective view of a direct flame impingement shield in accordance with the invention.

FIG. 2 illustrates a direct flame impingement shield received within a fire tube. Direct flame impingement shield 100 is positioned in fire tube 110 having external flange 135. Flame igniter 145 rests on cross member 40 coupled to internal surface 60 of barrier tube 10 having flared end portion 20.

Figure 3:
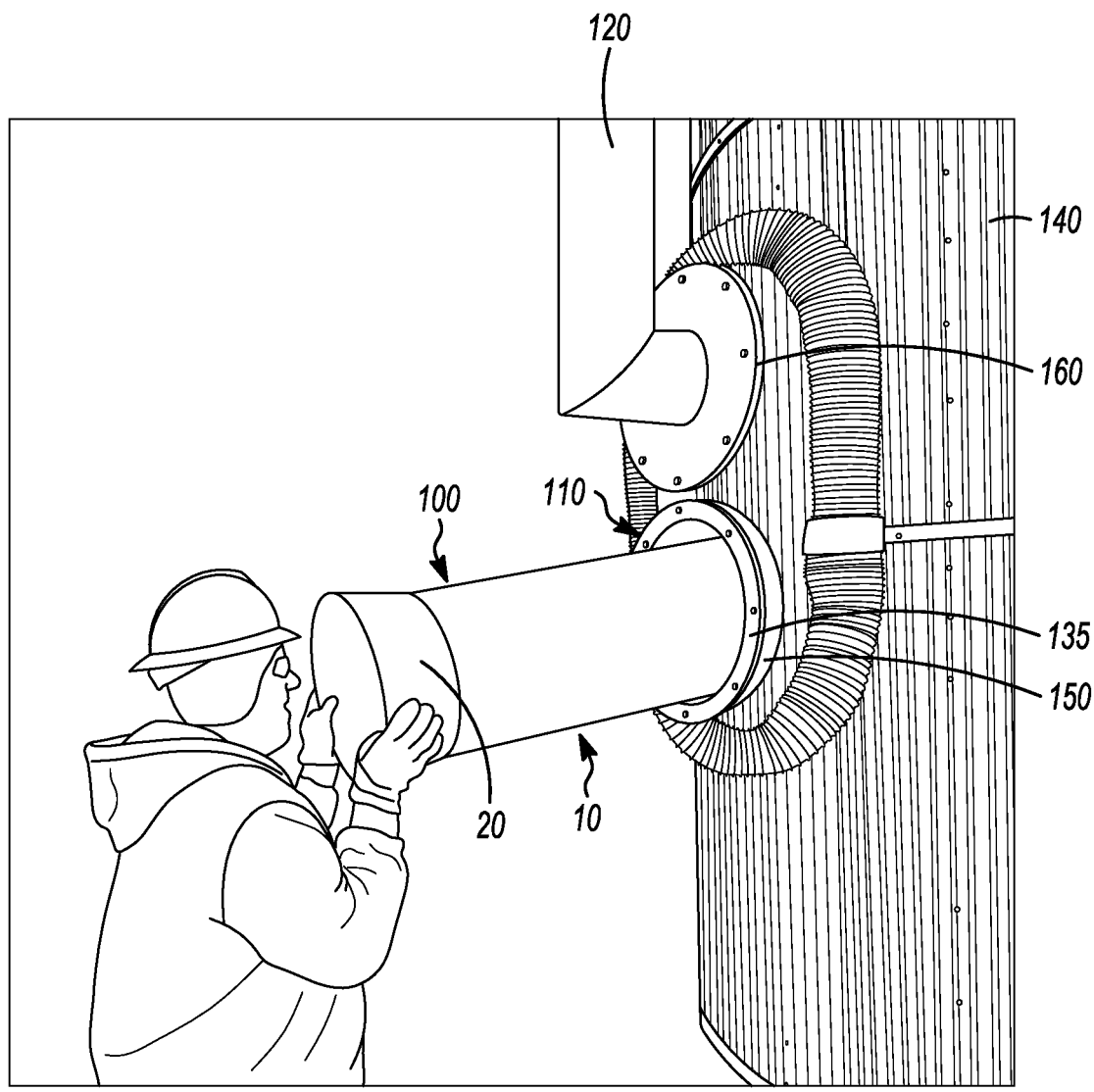
FIG. 3 is a side view of an installation of a direct flame impingement shield in a fire tube in accordance with the invention.

FIG. 3 illustrates the assembly of a heater treater and fire tube having a direct flame impingement shield installed therein. Heater treater 140 is a large tank. Heater treater (tank) 140 is oriented vertically, however, tank 140 may also be oriented horizontally. Fire tube 110 is a U-shaped pipe with a lower section 150 having external flange 135 and internal flame arrestor (not shown) and an upper section 160. Direct flame impingement shield 100 is removably installed in fire tube 110. Heat enters fire tube 110 at lower section 150 through direct flame impingement shield 100 and passes through upper section 160 where it is vented at exhaust pipe 120.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

What is claimed is:

1. A direct flame impingement shield comprising:
   a barrier tube configured to be placed within an inner diameter of a fire tube of a heater treater;
   a tapered end portion on a back end of the barrier tube;
   a flared end portion on a front end of the barrier tube;
   a cross member internally positioned towards the front end of the barrier tube; and
   a leveling member externally positioned towards the back end of the barrier tube.

2. The direct flame impingement shield of claim 1, wherein the barrier tube, the tapered end portion, the flared end portion, the cross member and the leveling member are formed from a corrosion resistant material.

3. The direct flame impingement shield of claim 2, wherein the corrosion resistant material is selected from the group consisting of modified stainless steel, hybrid stainless steel, blended stainless steel, carbon steel and/or mixtures thereof.

4. The direct flame impingement shield of claim 1, wherein an end of the flared end portion is wider than the barrier tube.

5. A fire tube for a heater treater comprising:
   a direct flame impingement shield, the direct flame impingement shield comprising:
   a barrier tube configured to be placed within an inner diameter of the fire tube;
   a tapered end portion on a back end of the barrier tube;
   a flared end portion on a front end of the barrier tube;
   a cross member internally positioned towards the front end of the barrier tube; and
   a leveling member externally positioned towards the back end of the barrier tube, wherein the direct flame impingement shield is removably coupled to the fire tube.

6. The fire tube of claim 5, wherein the direct flame impingement shield extends through a portion of the length of the fire tube.

7. The fire tube of claim 5, wherein the direct flame impingement shield is formed from a corrosion resistant material.

8. The fire tube of claim 7, wherein the corrosion resistant material is selected from the group consisting of modified stainless steel, hybrid stainless steel, blended stainless steel, carbon steel and/or mixtures thereof.

9. The fire tube of claim 5, wherein an end of the flared end portion is wider than the barrier tube.

10. The fire tube of claim 5, wherein the leveling member rests on an inside surface of the fire tube.

11. A method of heating and separating a raw product comprising:
   passing the raw product through a heater treater having a fire tube;
   heating a fire tube with a heat source, wherein the fire tube comprises
   a direct flame impingement shield, the direct flame impingement shield comprising:
   a barrier tube configured to be placed within an inner diameter of the fire tube;
   a cross member internally positioned towards the front end of the barrier tube; and a leveling member externally positioned towards the back end of the barrier tube, wherein the direct flame impingement shield is removably coupled to the fire tube; and separating the raw product.

12. The method of claim 11, wherein the direct flame impingement shield further comprises a tapered end portion on a back end of the barrier tube and a flared end portion on a front end of the barrier tube.

13. The method of claim 11, wherein the direct flame impingement shield extends through a portion of the length of the fire tube.

14. The method of claim 11, wherein the direct flame impingement shield is formed from a corrosion resistant material.

15. The method of claim 14, wherein the corrosion resistant material is selected from the group consisting of modified stainless steel, hybrid stainless steel, blended stainless steel, carbon steel and/or mixtures thereof.

16. The method of claim 12, wherein an end of the flared end portion is wider than the barrier tube.

17. The method of claim 11, wherein the leveling member rests on an inside surface of the fire tube.

18. The method of claim 11, wherein the heat source rests on the cross member.

19. The method of claim 11, wherein the heating and separating is at a well site.

20. The method of claim 11, wherein the heating and separating is at a refinery.

* * * * *